Oct. 4, 1955 W. J. WITWER 2,719,727
TURNING MECHANISM FOR TRAILER
Filed Sept. 22, 1952 2 Sheets—Sheet 1

INVENTOR.
WALLACE J. WITWER
BY
Isler & Ornstein
ATTORNEYS.

INVENTOR.
WALLACE J. WITWER
BY
ATTORNEYS.

United States Patent Office 2,719,727
Patented Oct. 4, 1955

2,719,727

TURNING MECHANISM FOR TRAILER

Wallace J. Witwer, Galion, Ohio, assignor to The Cobey Corporation, Galion, Ohio, a corporation of Ohio Application September 22, 1952, Serial No. 310,813

5 Claims. (Cl. 280—103)

The present invention relates to a turning or steering mechanism, and more particularly to a steering mechanism for drawn vehicles such as trailers and wagons.

In agricultural pursuits, the farm wagon is utilized to a great extent. The wagon is customarily pulled by a tractor or other prime mover and generally is provided with a front wheel steering mechanism which responds to horizontal pivotal movement of the draw-bar which connects the wagon to the tractor.

The conventional form of steering mechanism, which utilizes steering knuckles connected by a tie rod, permits the wheels to have a turning angle of about 45°. This turning radius is inadequate for normal farming operations in which an irregular course of travel is followed and abrupt, sharp turns are often required.

In order to obtain a greater degree of turning maneuverability, some farm wagons have been provided with a fifth wheel or axle type of turning mechanism. These wagons are constructed to permit pivotal movement of the axle instead of pivotally moving the wheels on spindles. This construction permits over 90° of turning movement but seriously affects the stability of the wagon, especially when it is loaded.

It is the primary object of my invention to provide a steering mechanism for farm wagons which will be capable of a turning movement of up to 90°, thus obtaining the maneuverability of the axle-type steering, while at the same time retaining the stability of spindle-type steering.

Another object of my invention is to provide a steering mechanism of the character described which is provided with adjusting means for compensating for the normal wear of the mechanism.

Other objects and advantages of my invention will be apparent during the course of the following description. In the accompanying drawings forming a part of this specification and in which like numerals are employed to designate like parts throughout the same, Fig. 1 is a top plan view of the frame or chassis of a farm wagon embodying the steering mechanism which I have invented;

Figure 1:
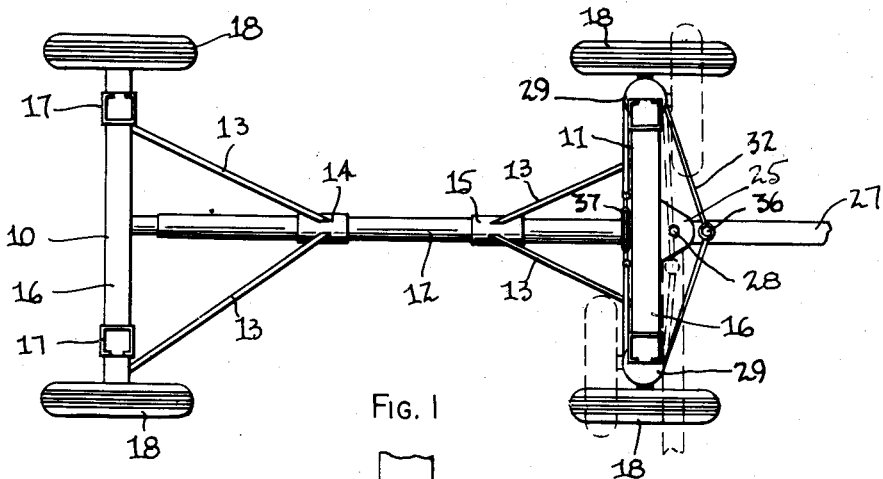

Referring more particularly to the drawings, the wagon frame comprises a rear axle 10 and a front axle 11 which are suitably connected in spaced relationship by a tubular longitudinally extending reach pole 12, which is formed of two telescoping sections to permit the frame to be adjusted to accommodate various lengths of bodies. The frame is strengthened and reinforced by angularly extending brace members 13 which connect the axles 10 and 11 to collars 14 and 15, respectively, on the reach pole 12. Each of the axles 10 and 11 is surmounted by a bolster 16 having upstanding supports 17 which are adapted to accommodate the wagon body.

The rear axle 10 is provided with rotatable wheels 18 which are secured to the axle in a conventional manner. The front axle 11 is recessed at each end thereof, as indicated by the reference character 19, thus defining a yoke 20 having parallel vertically spaced arms 21. A spindle 22, having a radial arm 23, is pivotally secured between the arms 21 by means of a spindle bolt 24 which extends therethrough. The front wheels 18 are rotatably mounted on the spindle arms 23 in a conventional manner.

Midway of the axle 11, and extending forwardly thereof, is secured, as by welding, a connector 25 consisting of two vertically spaced ears 26 between which is pivotally secured a draw-bar 27 by means of a bolt or pin 28 extending therethrough. It will be understood that the free end of the draw-bar may be provided with suitable means for attaching it to a tractor or the like.

Figure 4:
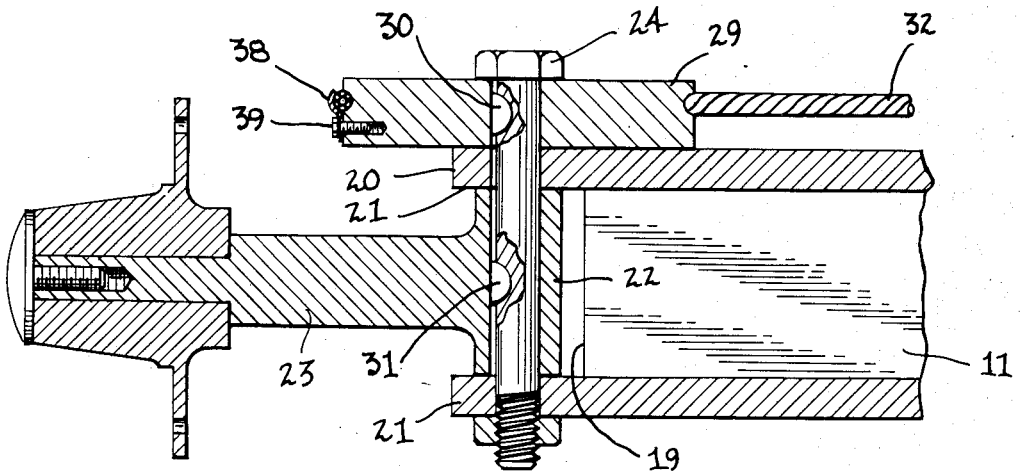
Fig. 4 is an enlarged fragmentary cross-sectional view taken on line 4—4 of Fig. 2.
Figure 5:
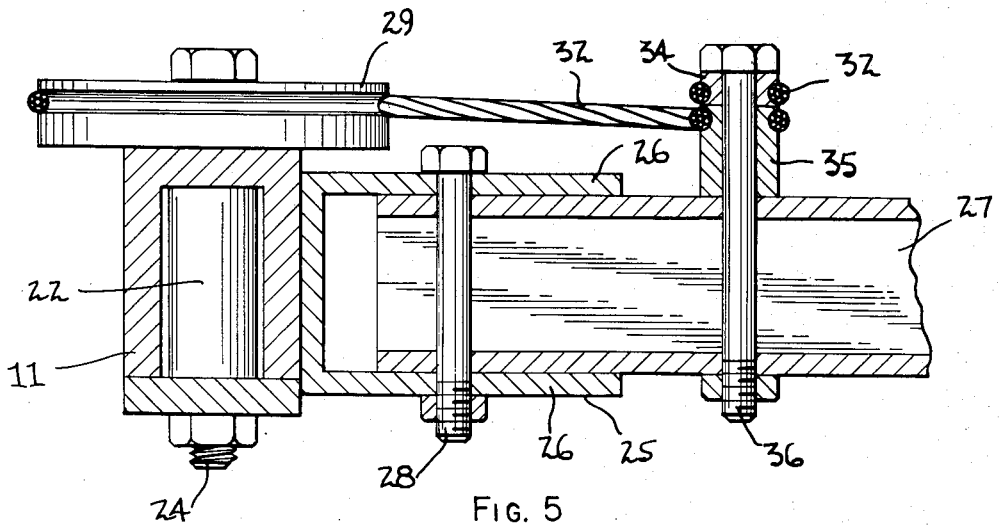
Fig. 5 is an enlarged fragmentary cross-sectional view taken on line 5—5 of Fig. 3.

As best seen in Figs. 4 and 5, the novel steering or turning mechanism includes a pair of sheaves 29, each of which is secured by means of a key 30 to one of the bolts 24 so as to rotate therewith. The spindle 22 is likewise secured to the spindle bolt 24 by means of another key 31 so that both the spindle and the sheave 29 will rotate together.

A flexible element, such as a wire cable 32, is trained around the spaced sheaves 29. The free ends of the cable 32 are looped around and secured, as by clamps 33, to circumferentially grooved pulleys 34 and 35 which are rotatably secured to the drawbar 27 by means of a rod or anchor bolt 36 extending therethrough. A turnbuckle 37 is disposed intermediate the ends of the cable 32 for a purpose to be described.

Figure 2:
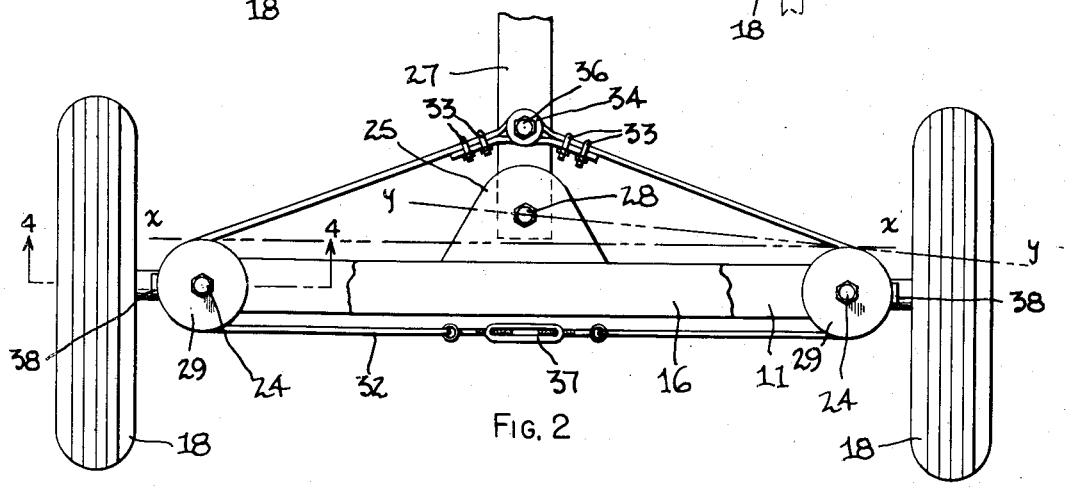
Fig. 2 is a fragmentary enlarged plan view of the forward portion of the wagon shown in Fig. 1.
Figure 3:
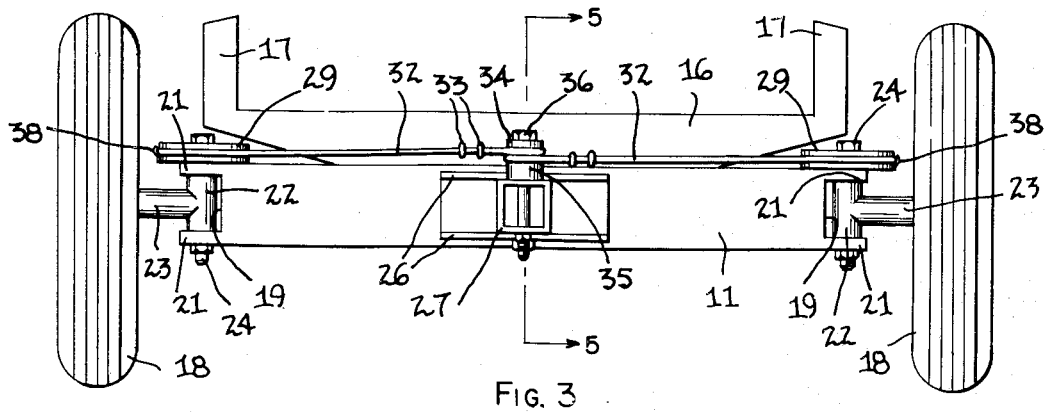
Fig. 3 is a front elevation of the steering mechanism shown in Fig. 2.

Each of the sheaves 29 is provided with a clamping element 38 which is secured to the edge of the sheave by means of a cap screw 39 and which is adapted to frictionally grip the cable 32 and prevent it from slipping on the sheave 29. As best seen in Fig. 2, the clamps are so located on the sheaves that they will be in longitudinal alignment with the axle 11 and the spindle arms 23 when the front wheels 18 are square with the axle.

It will be noted that the anchor bolt 36 is spaced radially from the drawbar pivot pin 28, so that any horizontal pivotal movement of drawbar 27 will be translated into orbital movement of anchor bolt 36 and a corresponding linear movement of cable 32. The cable, in turn, causes angular rotation of the sheaves 29 which results in rotary movement of the spindle arm 23 to cause steering of the front wheels 18.

Thus, as indicated in dotted outline in Fig. 1, when the drawbar 27 pivots in response to changes in the direction of the travel of the tractor which the wagon is trailing, the front wheels 18 will turn in response thereto and track the tractor. The drawbar and the wheels may, as a practical matter, have a turning arc of 90° in either direction from the longitudinally aligned or square position, making a total swing of 180°. The turning radius of the wagon then would be substantially equivalent to its own wheelbase length. This extreme degree of turning ability is effected without any loss of stability such as would occur in the rotatable-axle type of steering arrangement.

The turnbuckle 37 is utilized to draw the cable 32 taut when it is originally installed on the wagon frame. If, after a period of use, the cable should stretch slightly, its tautness can be reestablished by proper manipulation of the turnbuckle and the clamps 38. This adjustment prevents any loss of sensitivity in the steering mechanism due to slackness in the cable.

The pulleys 34 and 35 rotate slightly in response to horizontal pivotal movement of the drawbar 27 so as to minimize the frictional abrading on the looped ends of the cable 32 and thereby avoid premature failure at the point where the cable ends are anchored. It will be understood that suitable anti-friction devices such as ball-bearings and sleeve bearings may be incorporated in the design of the device, such as in the sheave and spindle assembly, as is well known to those skilled in the art.

It is to be noted that there are several variable factors which must be taken into consideration in designing a steering mechanism of the character described. These factors may be itemized as follows:

(a) The diameter of the sheaves 29, or more specifically, the circumference of the grooved portion of the sheave.

(b) The distance between the pivot pin 28 and the anchor bolt 36, which defines the radius of movement of the anchor bolt.

(c) The relationship or angularity between a line $x$—$x$ (shown in Fig. 2) which is a tangent common to the sheaves and parallel to a line connecting their centers, and a line $y$—$y$ (shown in Fig. 2) which is a tangent from the pivot pin 28 to either of the sheaves 29.

The angularity between the lines $x$—$x$ and $y$—$y$ is determinative of the angle or arc through which the drawbar 27 must be pivoted in either direction from center to obtain maximum angular rotation of the sheaves 29. Thus if the acute angle between lines $x$—$x$ and $y$—$y$ were 10°, then the drawbar would have to swing to a position 10° from line $x$—$x$, equivalent to 80° from its median position, in order to rotate the sheave to its maximum angularity. It follows, therefore, that complete synchronization of the maximum movements of the sheaves and the drawbar would occur when line $y$—$y$ coincides with line $x$—$x$, if it is assumed that the maximum movement of the drawbar in any one direction is 90°.

The relationship between the factors (a) and (b), mentioned above, determines the ratio between the angular rotation of the drawbar and sheaves. Thus the factor (b), or radius, may be established by mathematical formula at a value which would cause the sheaves to rotate through 90° when the drawbar is pivoted to a position of coincidence with line $y$—$y$. If this value of the radius be increased, without any change in the factor (a), then maximum rotation of the sheaves will exceed 90°. If this value of the radius is decreased, then maximum rotation of the sheaves will be less than 90°.

By selecting appropriate values of the factors (a), (b) and (c) various desired steering characteristics can be obtained for special purposes. For conventional farm wagon applications, it is desirable that the angularity factor (c) be in the neighborhood of 0°, possibly ranging to 15°; the relationship between the factors (a) and (b) should be such that the pivoting of the drawbar to the line position $y$—$y$ from its median position will describe an angle of the same value in degrees as the maximum angular rotation of the sheaves.

During the operation of the steering mechanism, above described, there is force exerted on only that end of the flexible element 32 which is being extended by the movement of the drawbar. This force is then transmitted through one of the sheaves 29 to that portion of the cable 32 which lies between the clamps 38 and which is always taut. The other sheave 29 responds to the movement of that portion of the cable. The other end of the cable 32 exerts no force on its companion sheave until the direction of movement of the drawbar is reversed. The use of a flexible element thus prevents a counterplay of forces on the sheaves 29, such as would occur if rigid connecting rods were used in lieu thereof.

It is to be understood that the form of my invention, herewith shown and described, is to be taken as a preferred example of the same, and that various changes in the shape, size, and arrangement of parts may be resorted to, without departing from the spirit of my invention, or the scope of the subjoined claims.

Having thus described my invention, I claim:

1. In a steering mechanism, the combination of spaced axially rotatable wheel spindles, circular elements secured to said spindles coaxially thereof for rotation therewith, a steering member pivotally movable in a horizontal plane, an endless flexible element trained over said circular elements and pivotally anchored to said steering member at a point spaced from the pivot point of said member whereby pivotal movement of said member causes axial rotation of said circular elements, and wheel-supporting means extending from each of said spindles.

2. In a steering mechanism, the combination of horizontally spaced spindles mounted for axial rotation in a horizontal plane, a circular element fixedly secured to each of said spindles coaxially thereof for rotation therewith, a steering member mounted for pivotal movement in a horizontal plane, a flexible element trained over said circular elements and having the ends thereof pivotally anchored to said steering member at a point spaced radially from the pivot point of said member whereby said circular elements and said spindles rotate in response to horizontal pivotal movement of said member, and wheel-supporting means extending from each of said spindles.

3. In a steering mechanism, the combination of horizontally spaced spindles mounted for axial rotation in a horizontal plane, a sheave fixedly secured to each of said spindles coaxially thereof for rotation therewith, a steering member mounted for pivotal movement in a horizontal plane, an endless flexible element trained over said sheaves and pivotally anchored to said steering member at a point spaced radially from the pivot point of said member, clamping means mounted on each of said sheaves at predetermined points and engaging said flexible element whereby said sheaves rotate in response to pivotal movement of said steering element, and wheel-supporting means extending from each of said spindles.

4. In a steering mechanism, the combination of spaced axially rotatable wheel spindles, circular elements secured to said spindles coaxially thereof for rotation therewith, a steering member pivotally mounted intermediate said circular elements for movement about a vertical axis, an anchor element provided on said steering member in radially-spaced relationship to said vertical axis, said anchor element defining an orbital path of movement about said vertical axis in response to rotation of said steering member about said axis, and an endless flexible element trained over said circular elements and secured to said anchor element, said flexible element traversing the orbital path of movement of said anchor element, whereby maximum angular rotation of said circular elements occurs in response to pivotal movement of said steering member through an arc of 180 degrees maximum.

5. In a steering mechanism, the combination of horizontally-spaced axially rotatable wheel spindles, a circular element fixedly secured to each of said wheel spindles for coaxial rotation therewith, a steering member pivotally mounted intermediate said circular elements for rotation about a vertical axis, an anchor element mounted on said steering member in radially-spaced relationship to said vertical axis and defining an orbital path of movement about said axis in response to rotation of said steering member, and an endless flexible element trained over said circular elements and pivotally secured to said anchor element, said flexible element linearly traversing the path of orbital movement of said anchor element, whereby said circular elements are rotated to a maximum angular displacement in response to rotation of said steering member through an arc of 180 degrees maximum.

References Cited in the file of this patent

UNITED STATES PATENTS

| | | |
|---|---|---|
| Re. 13,169 | Flaig | Nov. 22, 1910 |
| 949,202 | Shedenhelm | Feb. 15, 1910 |
| 2,631,045 | McElhinney et al. | Mar. 10, 1953 |